Oct. 31, 1961   B. M. HILL   3,006,452
MATERIAL HANDLING APPARATUS
Filed May 6, 1959
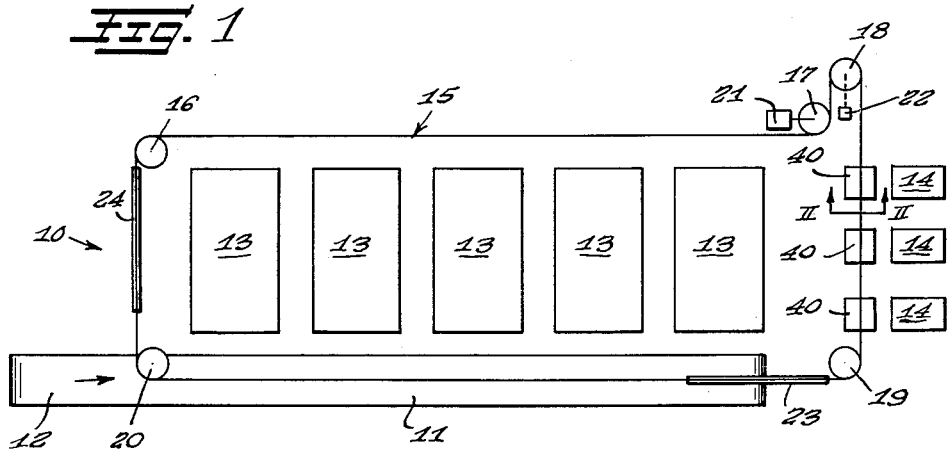
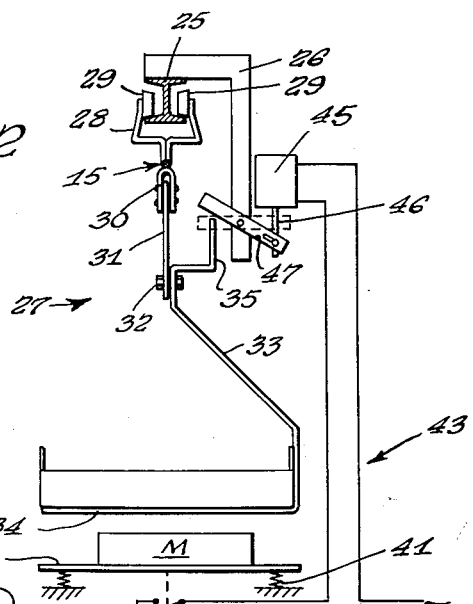
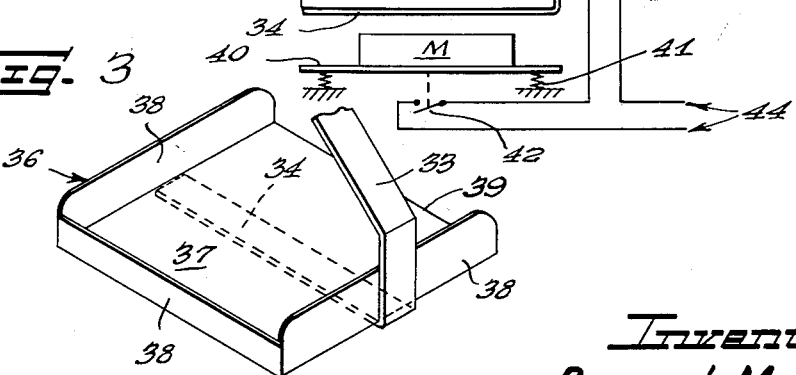
Inventor
Bernard M. Hill

United States Patent Office 3,006,452
Patented Oct. 31, 1961

3,006,452
MATERIAL HANDLING APPARATUS
Bernard M. Hill, Chicago, Ill., assignor to Northern Electric Company, Chicago, Ill., a corporation of Delaware
Filed May 6, 1959, Ser. No. 811,377
5 Claims. (Cl. 198—19)

This invention relates generally to material handling apparatus, and more specifically to an improved conveyor system.

Although the principles of the present invention may be included in various types of material handling apparatus, a particularly useful application is made in conveyor systems that receive material to be conveyed from a plurality of sources and deliver such material to a plurality of destinations.

In particular, the instant system is especially suitable for use wherein the individual sources and the individual destinations respectively have an intermittent supply and an intermittent demand, because the conveyor system is also capable of carrying out a storage or bank function. Thus when the supply rate increases temporarily from the demand rate, the conveyor accepts and stores the surplus. Likewise, when the demand rate temporarily exceeds the supply rate, the conveyor system automatically compensates for this condition by drawing on the quantity of conveyed material stored thereon.

Accordingly, it is an object of the present invention to provide an automatic material handling apparatus.

Another object of the present invention is to provide a conveyor system which is capable of automatically accommodating a temporarily excessive supply rate.

Another object of the present invention is to provide a conveyor which is capable of accommodating a temporarily excessive demand rate.

Yet another object of the present invention is to provide a conveyor assembly for receiving material intermittently from a number of supply stations, and for delivering material intermittently to a number of destinations automatically, wherein material from any one of the sources may be delivered to any one of the destinations.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:
FIGURE 1 is a schematic plan view of a material handling apparatus constructed in accordance with the principles of the present invention;
FIGURE 2 is an enlarged and somewhat more detailed view taken along line II—II of FIGURE 1; and
FIGURE 3 is a perspective view of a portion of FIGURE 2.

As shown on the drawings:

The principles of this invention are particularly useful when embodied in a material handling apparatus or conveyor system such as diagrammatically illustrated in FIGURE 1, generally indicated by the numeral 10. A belt conveyor 11 is disposed to be provided with articles at one end 12 and to convey them in the direction of the arrow. The conveyor 11 passes alongside a series of work tables or work stations, each designated by the numeral 13, so that an operator standing intermediate one of the work stations 13 and the conveyor 11 may lift a conveyed article or material from the conveyor 11 onto the table or station 13 for performing a manual operation thereon. In this example, the nature of the operation at each of the stations 13 is substantially identical. Thus a particular article would be transferred by hand from the conveyor 11 to only one of the stations 13 for being worked on. Upon completion of this step, it is desired to transfer the material or article from the station 13 to one of a second series of work stations, each identified by the numeral 14. It is the transfer of the material from the station 13 to the station 14 to which the instant invention is directed.

Accordingly, the novel material handling apparatus 10 of my invention includes an endless conveyor 15 which is directed around a series of guide wheels 16–20. The portion of the conveyor 15 disposed between the guide wheels 16 and 17 has a location adjacent to the opposite side of each of the work stations 13 so that an operator standing intermediate the work station and the conveyor 15 may readily deposit thereon such articles as have been processed at the station 13. It is apparent, in the instant diagram, that five such stations are shown, which therefore, with respect to the conveyor 15, may be termed as multiple sources of material.

The guide wheel 17 is also provided with a variable speed drive means schematically shown at 21, by which the wheel 17 effects continuous rotation or movement of the endless conveyor 15. The guide wheel 18 is provided with means diagrammatically indicated at 22 for controlling or adjusting the tension on the conveyor 15.

The portion of the conveyor 15 extending between the guide wheels 16 and 17 is disposed so that the conveyor may be loaded at approximately the same height as the work stations 13. Likewise, the conveyor 11 is disposed so that it may be unloaded at substantially the same height. In order to provide a vertical clearance between the conveyor 15 and the conveyor 11, the conveyor 15 is provided with an increase in grade of approximately three feet diagrammatically indicated at 23, and a corresponding decrease in grade diagrammatically indicated at 24.

As best seen in FIGURE 2, the conveyor 15 includes, in this embodiment, a monorail 25 supported by a suitable frame 26.

The endless conveyor 15 includes a number of material carriers such as shown in FIGURE 2 and generally indicated by the numeral 27. Each of the carriers 27 is secured to the conveyor 15 and is movable therewith in a generally clockwise direction as viewed from above in FIGURE 1. Each carrier may be provided with a yoke 28 having wheels 29 which ride on the rail 25. Thus the yoke 28 provides for the actual support of the endless portion of the conveyor 15.

A further portion of the carrier 27 includes a downwardly directed U-shaped member 30 to which is secured a hanger 31. At the lower end of the hanger 31 there is provided an aperture through which a nut-bolt-bushing assembly 32 is directed, and on which a rigid support bracket 33 is pivotally supported.

The support bracket 33 includes a generally horizontal distal portion 34, the free end of which is directed toward the stations 13 as it passes thereby. The bracket 33 also includes a rigid ear 35 which extends to the side of the pivotal axis which is opposite to that on which the distal portion 34 is located. The function of the ear 35 is set forth later herein.

The distal portion 34 of the bracket 33 supports a material-storage tray 36 which is open at its top so that access thereto may be had by the operator standing between one of the stations 13 and that portion of the conveyor 15 extending between the guide wheels 16 and 17.

The tray 36 includes a relatively smooth or polished bottom 37, and preferably also includes sides or guides 38 at its forward and lateral edges. However, the rearwardly directed edge 39 is free of any obstruction so that material supported by the tray may be discharged across the unobstructed free edge 39. When the tray 36 is pivoted about the pivotal axis at 32, gravity effects the emptying of material therefrom.

It will be noted that the pivotal axis of the nut-bolt-bushing assembly 32 is generally horizontal, and is transverse to the direction in which the monorail 25 extends and thus is transverse to the direction in which the carrier 27 as a whole is moved by the conveyor 15.

It is to be understood that the work stations 14 may each comprise multiple stations. However, for each destination station 14 there is provided a material support member 40, shown in FIGURE 2 to comprise a table. The support member 40 is disposed laterally adjacent then to the destination station 14 and downwardly adjacent to the conveyor 15, there being such a support member for each destination station as defined.

Means are provided with each support member for rendering such support member 40 responsive to the presence of material thereon, indicated at M in FIGURE 2. The actual presence of material may be determined by one of its physical properties, for example its weight, its opacity, or its conductivity. In the instant embodiment, the support member 40 has been illustrated as being responsive to the weight property of the material M. To this end, the table 40 is resiliently biased in an upward direction as schematically illustrated at 41, such bias being overcome by the weight of the material M. The support member 40 in this embodiment is connected to a switch 42 for closing an electric circuit generally indicated at 43 whenever there is no material M on the support member 40, and for keeping the circuit open whenever there is such material supported thereon.

When a potential is applied to the ends 44 of the electric circuit 43, and when the switch 42 is closed, the circuit 43 is completed to a solenoid actuator 45 which has a plunger 46 which is drawn inwardly thereby. The solenoid plunger 46 is slidably connected to one end of an abutment member 47 which is pivotally supported by the frame 26 for movement into and out of the path in which the ear 35 of the bracket 33 is moved by advance of the conveyor 15. Thus when the circuit 43 is closed, the other end of the abutment member 47 is in a position to oppose forward movement of the upper end 35 of the bracket 33, which reaction or opposition therefore causes the tray 36 to be pivoted or moved in the same general direction as the movement of the conveyor 15, but at a faster rate to effect the emptying thereof. During such emptying, the material M falls onto the support member 40. The solenoid 45 and the abutment member 47 thus comprise a solenoid-actuated linkage wherein the abutment member may be positioned by the solenoid to apply a pivoting or reactive force to the tray 34.

Material is delivered on the conveyor 11 which is supplied with material in a conventional way (not shown), and the surplus of material thereon is disposed of also in a conventional manner (not shown). Thus as material moves on the conveyor 11 adjacent to each of the stations 13, operators selectively transfer material as needed to each of the stations 13.

After the operation at that station 13 has been completed, an operator selectively manually transfers material directly onto the adjacent portion of the conveyor 15, depositing the same in one of the carriers 27.

An operator at one of the destination stations 14 who is in need of material to work on manually selects the same from the support member 40. The removal of the material M therefrom is operative to effect closure of the circuit 43, and hence is operative to effect emptying of the next carrier 27 to arrive adjacent to that station. If the carrier be empty, the tray 36 is nevertheless tilted. Similarly, each succeeding carrier is tilted until material has been deposited onto the support member 40 to effect opening of the circuit 43.

If a full carrier approaches a support member which has material on it, the tray, of course, is not tilted and the carrier moves on to a position adjacent to the next station 14, being emptied only if there is a need for material at such destination station. Thus if there be no need for additional material at any one of the support members 40, the full carrier continues to store the material and makes a revolution past the source stations 13 in a full condition.

Ideally, it is desirable to have a number of carriers on the conveyor so loaded, and the conveyor operating at such speed, that during an average rate of production from the stations 13, there will always be some carriers which go past the stations 13 in a full condition, some carriers which get filled at the stations 13, and some carriers which go past the stations 13 in an empty condition. Thus if there is a temporary increase in production rate at the source stations 13, there will be carriers 27 available for accepting and storing such additional articles.

Likewise, at an average rate of production, it is preferable that not all of the carriers be emptied at the destination stations 14 and that some carriers go past this group of stations in an empty condition. In the event that the demand at the stations 14 is temporarily increased, such demand is satisfied by the emptying of the carriers which otherwise would pass by unemptied.

Thus a temporary increase in production rate at the stations 13, and a temporary increase in production rate at the stations 14 will both be permitted by the instant material handling apparatus.

It will be noted that the instant apparatus can successfully combine or cooperate with any number of source stations, and any number of destination stations. In doing so, it also allows for temporary increases or decreases in production at any one of the source or destination stations and in effect averages out any differences in rate between such individual stations, and in addition allows for and compensates for a change in the total production rate of either type of station. In an actual installation, the number of stations which would normally be employed would be four source stations and two destination stations. The variable speed drive 21 would therefore be set to handle the amount of production which these stations have. However, due to individual differences of operators, it becomes almost physically impossible to have a perfect equality or ratio of this type. Accordingly, I have provided a fifth supply station and a third destination station, one of which may be operated continuously, and the other of which may be operated only to the extent needed to complement the system as a whole. Thus the occasional use of one of the source or destination stations to respectively build up or to reduce the amount of material being stored on the conveyor 15 effects a production balance made possible by the construction of the instant apparatus.

Although various minor modifications might be suggested by those versed in the art, it should be understood that I wish to embody within the scope of the patent warranted hereon all such embodiments as reasonably and properly come within the scope of my contribution to the art.

I claim as my invention:

1. Material handling apparatus comprising in combination: an endless conveyor disposed to move adjacently to a source of material, and adjacently to a destination station; a series of material carriers secured to said conveyor and being movable therewith, each of said carriers including a material-storage tray having a normally horizontal substantially flat material support surface, one edge of which surface is free of any obstruction to discharge of material stored in said tray; each of said carriers also including an elongated bracket, the lower end of which is disposed below and secured to said tray, said bracket extending around one edge of said tray remote from said obstruction-free-edge, thence in a generally upward and inward direction to a pivot point above and substantially in line with the center of gravity of said tray, said one edge of the tray being the sole edge having an obstruction to loading of the tray; each of said carriers further including means acting at said pivot point on said bracket and freely swingably supporting said bracket and located a substantial distance above the center of gravity of said tray and said bracket; a material support member at said destination station and disposed adjacent to said conveyor; and means associated with said support member, responsive to the presence of said material thereon, and operative only in the absence of said material to effect pivoting of one of said trays in one direction to transfer material carried on said one tray onto said support member; said one of said trays being responsive to gravity, upon movement past said pivoting-effecting means, to pivot to a material-carrying attitude.

2. Material handling apparatus comprising in combination: an endless conveyor disposed to move adjacently to a source of material, and adjacently to a destination station; a series of material carriers secured to said conveyor and being movable therewith; each of said carriers including a material-storage tray pivotably supported and at all times freely swingable about an axis located a substantial distance directly above its center of gravity when both loaded and unloaded, and accessible at said source of material for being filled; said tray being constructed to discharge material stored therein in response to pivoting of said tray; a material support member at said destination station and disposed adjacent to said conveyor; and means associated with said support member, responsive to the presence of said material thereon, and operative only in the absence of said material to effect pivoting of one of said trays in one direction to transfer material carried on said one tray onto said support member; said one of said trays being responsive to gravity, upon continuation of movement in the same direction past said means, to pivot to a material-carrying attitude.

3. Material handling apparatus comprising in combination: an endless conveyor disposed to move adjacently to a source of material, and adjacently to a destination station; a series of material carriers secured to said conveyor and being movable therewith; each of said carriers including a material-storage tray accessible at said source of material for being filled, said tray being pivotally supported and at all times freely swingable about a horizontal axis located a substantial distance directly above the center of gravity of said tray when said tray is both loaded and unloaded, said axis being directed transversely to the direction in which said conveyor and said carriers are jointly movable; a rigid ear rigidly connected to said tray and swingable at all times therewith, said tray and said ear being disposed on opposite sides of said horizontal axis; said tray being constructed to discharge material stored therein in response to pivoting of said tray; a material support member at said destination station and disposed adjacent to said conveyor; an abutment member comprising part of said destination station and supported for movement into and out of the path in which said conveyor moves said ear; and means associated with said support member, responsive to the presence of said material thereon, and operative only in the absence of said material to effect movement of said abutment member into said path for engagement with said rigid ear, said abutment member being operative to apply a force to said ear of each of said carriers passing by and to thereby pivot said trays generally in the direction in which said conveyor is movable to transfer any material carried on said trays onto said support member; said trays being responsive to gravity, upon continuation of movement in the same direction of said rigid ear thereof past said abutment members, to pivot to a material-carrying attitude.

4. Material handling apparatus comprising in combination: an endless conveyor disposed to move adjacently to a source of material, and adjacently to a destination station; a series of material carriers secured to said conveyor and being movable therewith; each of said carriers including a material storage tray pivotally supported and freely swingable at all times about an axis located a substantial distance above its center of gravity when either loaded or empty, each of said trays being successively accessible at said source of material for being filled; each of said trays being constructed with an unrestricted edge over which any material carried therein is to be discharged; a material support member at said destination station and disposed beneath and adjacent to said conveyor; and means responsive to the presence of said material on said support member and successively associated with each of said movable trays, said means being operative only in the absence of said material thereon to effect transfer of material from the next arriving loaded one of said trays across said unrestricted edge thereof and onto said support member; said trays being normally responsive to gravity to assume and to maintain a stable material-carrying attitude when either full or empty.

5. Material handling apparatus comprising in combination: an endless conveyor disposed to move adjacently to a source of material, and adjacently to a destination station; a series of material carriers secured to said conveyor and being movable therewith, each of said carriers including a material storage tray having a normally horizontal substantially flat material support surface, one edge of which surface is free of any obstruction to discharge of material stored in said tray; each of said carriers also including an elongated bracket, the lower end of which is disposed below and secured to said tray, said bracket extending around one edge of said tray remote from said obstruction-free-edge, thence in a generally upward and inward direction to a pivot point above and substantially in line with the center of gravity of said tray, said one edge of the tray being the sole edge having an obstruction to loading of the tray; each of said carriers further including means acting at said pivot point on said bracket and freely swingably supporting said bracket and located a substantial distance above the center of gravity of said tray and said bracket; a material support member at said destination station and disposed adjacent to said conveyor; and means associated with said support member, responsive to the presence of said material thereon, and operative only in the absence of said material to effect transfer of material carried on said one tray across said obstruction-free edge thereof onto said support member; said one of said trays being responsive to gravity to assume and to maintain at all times a material-carrying attitude.

References Cited in the file of this patent
UNITED STATES PATENTS 1,241,476   French _____ Sept. 25, 1917
2,273,583   Meister _____ Feb. 17, 1942